United States Patent
Kawamoto et al.

(10) Patent No.: US 10,723,861 B2
(45) Date of Patent: Jul. 28, 2020

(54) INJECTION MOLDED BODY

(71) Applicant: Sumitomo Chemical Company, Limited, Tokyo (JP)

(72) Inventors: Yoshimi Kawamoto, Osaka (JP); Yoichi Yasutomi, Niihama (JP); Kazuki Daimatsu, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 16/098,927

(22) PCT Filed: May 18, 2017

(86) PCT No.: PCT/JP2017/018700
§ 371 (c)(1),
(2) Date: Nov. 5, 2018

(87) PCT Pub. No.: WO2017/200048
PCT Pub. Date: Nov. 23, 2017

(65) Prior Publication Data
US 2019/0092921 A1 Mar. 28, 2019

(30) Foreign Application Priority Data

May 20, 2016 (JP) .................. 2016-101170
Oct. 3, 2016 (JP) .................. 2016-195487

(51) Int. Cl.
| | | |
|---|---|---|
| *C08K 3/36* | (2006.01) | |
| *B29C 45/00* | (2006.01) | |
| *C08K 3/00* | (2018.01) | |
| *C08J 5/00* | (2006.01) | |
| *C08L 33/06* | (2006.01) | |
| *C08K 3/013* | (2018.01) | |
| *B29K 33/00* | (2006.01) | |
| *B29K 105/16* | (2006.01) | |
| *B29K 509/02* | (2006.01) | |

(52) U.S. Cl.
CPC .............. *C08K 3/36* (2013.01); *B29C 45/00* (2013.01); *B29C 45/0001* (2013.01); *C08J 5/00* (2013.01); *C08K 3/00* (2013.01); *C08K 3/013* (2018.01); *C08L 33/06* (2013.01); *B29K 2033/12* (2013.01); *B29K 2105/16* (2013.01); *B29K 2509/02* (2013.01); *B29K 2995/0087* (2013.01)

(58) Field of Classification Search
CPC ...... C08K 3/013; C08K 3/36; B29C 45/0001; B29C 45/00; C08J 5/00

USPC ........................................................ 524/430
See application file for complete search history.

(56) References Cited

U.S. PATENT DOCUMENTS

| | | | |
|---|---|---|---|
| 6,689,832 B1 | 2/2004 | Rostami | |
| 2007/0055017 A1 | 3/2007 | Schultes et al. | |
| 2008/0026237 A1 | 1/2008 | Koyama et al. | |
| 2010/0098907 A1 | 4/2010 | Schultes et al. | |
| 2012/0225241 A1* | 9/2012 | Kashima | B29C 45/0055 428/80 |
| 2013/0075959 A1* | 3/2013 | Ohya | B29C 45/14827 264/478 |

FOREIGN PATENT DOCUMENTS

| | | |
|---|---|---|
| CN | 107033512 A | 8/2017 |
| DE | 10349144 A1 | 5/2005 |
| DE | 102007005432 A1 | 7/2008 |
| EP | 2692793 A1 | 2/2014 |
| JP | H02170847 A | 7/1990 |
| JP | H0625609 A | 2/1994 |
| JP | H10219122 A | 8/1998 |
| JP | 2002530455 A | 9/2002 |
| JP | 2003211598 A | 7/2003 |
| JP | 2004131702 A | 4/2004 |
| JP | 2005-170771 * | 6/2005 |
| JP | 200830353 A | 2/2008 |
| JP | 2011110916 A | 6/2011 |
| JP | 2014-000770 * | 1/2014 |
| JP | 2014000770 A | 1/2014 |
| JP | WO2012133789 A1 | 7/2014 |

OTHER PUBLICATIONS

Machine translation of JP 2014-770 (Year: 2014).*
Machine translation of JP 2005-170771 (Year: 2005).*
International Search Report and Written Opinion dated Aug. 8, 2017 in International Application No. PCT/JP2017/018700.
Extended European Search Report dated Dec. 3, 2019 in EP Application No. 17799472.0.

* cited by examiner

*Primary Examiner* — Doris L Lee
(74) *Attorney, Agent, or Firm* — Panitch Schwarze Belisario & Nadel LLP

(57) ABSTRACT

An injection molded body containing a (meth)acrylic resin composition containing a (meth)acrylic resin and an inorganic filler and having a surface with an arithmetic average roughness of 20 nm or more and 280 nm or less is provided. The inorganic filler preferably has a particle diameter of 0.1 μm or more and 100 μm or less. An injection molded body having high glossiness and excellent scratch resistance, even when colored, and an automotive member containing the injection molded body are also provided.

9 Claims, 1 Drawing Sheet

INJECTION MOLDED BODY

CROSS-REFERENCE TO RELATED APPLICATION

This application is a Section 371 of International Application No. PCT/JP2017/018700, filed May 18, 2017, which was published in the Japanese language on Nov. 23, 2017 under International Publication No. WO 2017/200048 A1, which claims priority under 35 U.S.C. § 119(b) to Japanese Application No. 2016-101170, filed May 20, 2016, and Japanese Application No. 2016-195487, filed Oct. 3, 2016, the disclosures of which are incorporated herein by reference in their entirety.

TECHNICAL FIELD

The present invention relates to an injection molded body comprising a (meth)acrylic resin composition containing a (meth)acrylic resin and an inorganic filler.

BACKGROUND ART

As materials of automobile exterior members such as pillar parts and the like, general-purpose resins such as PP resins, ABS resins and the like are often used. In the field of automobile exterior members requiring scratch resistance, the scratch resistance may be compensated for by laminating a hard coat layer or a decorative film on the surface of a molded body obtained by injection molding such a resin.

In recent years, as a means for omitting the step of laminating a hard coat layer or a decorative film, a technique for improving the scratch resistance of the resin itself is drawing attention. For example, JP 2004-131702 describes that a resin composition obtained by blending inorganic fine particles having a size on the submicron order into an acrylic resin gives a molded body having improved surface hardness.

PRIOR ART DOCUMENT

Patent Literature

Patent Document 1: Japanese Unexamined Patent Application Publication No. 2004-131702

SUMMARY OF THE INVENTION

Problem to be Solved by the Invention

Automotive members with high design are often colored black, and a coloring member with high glossiness is being demanded. However, the coloring member with high glossiness tends to be inferior in so-called "scratch resistance" because scratches are more easily found by visual observation than members that are not colored. Hence, an injection molded body excellent in scratch resistance even when it is colored and having high glossiness is demanded.

However, the injection molded body obtained from the resin composition described in the above-described patent document tends to be inferior in scratch resistance if colored, and glossiness thereof is also not satisfactory.

Then, an object of the present invention is to provide an injection molded body excellent in scratch resistance even when it is colored and having high glossiness, and an automotive member comprising the injection molded body.

Means for Solving the Problem

The present invention includes the embodiments described in the following [1] to [5].

[1] An injection molded body comprising a (meth)acrylic resin composition containing a (meth)acrylic resin and an inorganic filler and having a surface with an arithmetic average roughness of 20 nm or more and 280 nm or less.

[2] The injection molded body according to [1], wherein the above-described inorganic filler is an inorganic particle with an average particle diameter of 0.1 µm or more and 100 µm or less.

[3] The injection molded body according to [1] or [2], wherein the content of the above-described inorganic filler in the (meth)acrylic resin composition is 0.01% by weight or more and 30% by weight or less.

[4] The injection molded body according to any one of [1] to [3], wherein the above-described inorganic filler is a metal oxide.

[5] The injection molded body according to any one of [1] to [4], wherein the above-described (meth)acrylic resin composition contains a dye or a pigment.

[6] An automotive member comprising the injection molded body according to any one of [1] to [5].

Effect of the Invention

According to the present invention, an injection molded body excellent in scratch resistance even when it is colored and having high glossiness, and an automotive member comprising the injection molded body can be provided.

MODES FOR CARRYING OUT THE INVENTION

Definition

Figure 1:
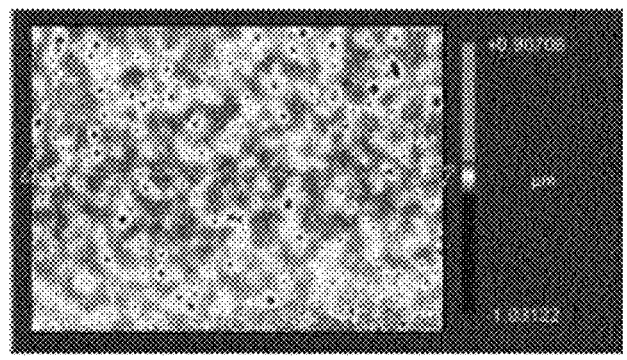
FIG. 1 is a view showing the surface profile of an injection molded body obtained in Example 4.

In the present specification, the term "inorganic filler" means a filler constituted of an inorganic material. In the present specification, the term "filler" means any substance which is solid at room temperature and atmospheric pressure and which is insoluble in components of the composition even when these components are heated to temperatures higher than room temperature, particularly, to the softening points or melting points thereof.

In the present specification, the term "(meth)acrylic resin" means a resin containing 50% by weight or more of monomer units derived from (meth)acrylate (provided that the total amount of monomer units contained in the resin is 100% by weight).

In the present specification, the term "(meth)acrylic resin composition" means a mixture of a (meth)acrylic resin and one or more components other than the (meth)acrylic resin wherein the content of the (meth)acrylic resin is 50% by weight or more.

In the present specification, the term "injection molded body" means a molded body produced by injection molding.

In the present specification, the term "inorganic particle" means a particle composed of an inorganic material.

In the present specification, the term "automotive member" means a member for forming a part of a motor vehicle.

The injection molded body of the present invention is a molded body comprising a (meth)acrylic resin composition containing a (meth)acrylic resin and an inorganic filler and having a surface with an arithmetic average roughness of 20 nm or more and 280 nm or less. Hereinafter, the arithmetic average roughness may be referred to as Ra.

In the present specification, the term "(meth)acrylic" refers to "methacrylic" or "acrylic", and the term "(meth) acrylate" refers to "methacrylate" or "acrylate".

The Ra of the surface of the injection molded body of the present invention refers to arithmetic average roughness that is defined in JIS B 0601, and is 20 nm or more and 280 nm or less, preferably 20 nm or more and 200 nm or less. By adjusting the Ra within the above-described range, it is possible to obtain an injection molded body excellent in scratch resistance even when it is colored and having high glossiness.

The Ra of the surface of the injection molded body of the present invention can be adjusted by changing the kind, particle diameter and addition amount of the inorganic filler, molding conditions during injection molding, and the like. For example, Ra can be decreased by decreasing the particle diameter of the inorganic filler, while Ra can be increased by lowering the mold temperature during injection molding.

In addition, it is preferable that the surface of the injection molded body of the present invention has a non-through hole (that is, recess) with an average pore diameter of 30 μm or more and 100 μm or less. The injection molded body of the present invention having a non-through hole with an average pore diameter of 30 μm or more and 100 μm or less on its surface is more excellent in scratch resistance even when it is colored.

The Ra of the surface of the injection molded body and the average pore diameter of the non-through hole are measured using a three-dimensional surface structure analysis microscope, and specifically, calculated with adjusting the size of the measurement field to 0.70 mm×0.53 mm and setting the measurement conditions as follows. The Ra is calculated in accordance with JIS B 0601 from the image. On the other hand, the average pore diameter is calculated according to the measured average value of the pore diameter in the image.

<Measurement Condition>
Lens:
  Objective lens: 10 times
Measurement Conditions
  Camera Mode: 640×480 72 Hz
  Substruct Sys Err: OFF
  Min Mod (%): 7
  Min Area Size: 7
  Scan length: 10 μm
  FDA Res: normal The pencil hardness of the injection molded body is preferably H or more. The pencil hardness is measured according to JIS K 5600 (load 750 g) using a pencil hardness measuring instrument.

The injection molded body of the present invention is produced by molding a (meth)acrylic resin composition containing a (meth)acrylic resin and an inorganic filler using an injection molding machine.

As a method for molding the (meth)acrylic resin composition, there are various methods such as an extrusion molding method, a press molding method, an injection molding method, and the like. However, in the present invention, a molded body excellent in scratch resistance and having high glossiness can be obtained by selecting an injection molding method as the molding method and adjusting the Ra of the surface of the injection molded body to be manufactured within the above-described range.

As the injection molding method, for example, there is a method of heating and melting the resin composition in a cylinder of an injection molding machine, pouring the resin composition into a cavity of a metal mold and molding it under pressure applied. The temperature of the mold during injection molding is preferably 40° C. or more and 150° C. or less, and more preferably 60° C. or more and 100° C. or less. If a heat and cool molding technology is used during injection molding, molding at a high mold temperature is possible. When the temperature of the mold is within the above-described range, it is possible to suppress generation of poor appearance such as sink mark or the like due to the temperature in the mold and the molding cycle can be shortened. Further, it is possible to obtain an injection molded body which is more excellent in scratch resistance even when it is colored and having high glossiness. In addition, Ra can be increased by lowering the mold temperature. The cylinder temperature is preferably 150° C. or more and 300° C. or less, more preferably 200° C. or more and 300° C. or less. When the cylinder temperature is within the above-described range, the flowability of the (meth) acrylic resin composition can be increased, and discoloration caused by decomposition of the (meth)acrylic resin can be suppressed. The injection pressure is preferably 50 MPa or more and 200 MPa or less. The holding pressure is preferably 20 MPa or more and 100 MPa or less. By performing injection molding under such conditions, it is possible to obtain an injection molded body having a surface with a glossiness of 60 or more at an incident angle of 60° as described later.

The (meth)acrylic resin is a resin containing 50% by weight or more of monomer units derived from (meth) acrylate (provided that the total amount of monomer units contained in the resin is 100% by weight). Examples of the (meth)acrylic resin include a resin containing only a monomer unit derived from one kind of (meth)acrylate, a resin containing only monomer units derived from two or more kinds of (meth)acrylates, a resin containing a monomer unit derived from a (meth)acrylate and a monomer unit derived from the other monomer capable of polymerizing with the (meth)acrylate, and the like. In the present invention, the (meth)acrylic resin composition may contain one kind of (meth)acrylic resin or may contain two or more kinds of (meth)acrylic resins.

The content of the monomer unit contained in the (meth) acrylic resin can be determined by analysis using pyrolysis gas chromatography or the like.

Examples of the (meth)acrylate include aliphatic (meth) acrylates such as methyl (meth)acrylate, ethyl (meth)acrylate and the like (also referred to as alkyl (meth)acrylate); cyclic (meth)acrylates such as cyclohexyl (meth)acrylate and the like (also referred to as cycloalkyl (meth)acrylate): aromatic (meth)acrylates such as phenyl (meth)acrylate and the like (also referred to as aryl (meth)acrylate), and the like. As the (meth)acrylic resin, polymethyl methacrylate is preferable.

The melt flow rate of the (meth)acrylic resin (hereinafter sometimes referred to as MFR and measured according to JIS K 7210 at a temperature of 230° C. under a load of 3.8 kg) is preferably 0.3 g/10 min or more and 30 g/10 min or less, further preferably 1 g/10 min or more and 10 g/10 min or less.

The other monomer capable of polymerizing with the (meth)acrylate includes styrene, acrylonitrile, vinyl acetate and the like.

The method for producing the (meth)acrylic resin includes bulk polymerization, emulsion polymerization, suspension polymerization and the like.

The above-described (meth)acrylic resin composition may contain other thermoplastic resins, in addition to the above-described (meth)acrylic resin. Such a thermoplastic resin includes polypropylene resins, polycarbonate resins, ABS resins and the like. The content of the thermoplastic resin in the above-described (meth)acrylic resin composition is usually 50% by weight or less, preferably 30% by weight or less. However, the total amount of the (meth)acrylic resin and the thermoplastic resin other than the (meth)acrylic resin is taken as 100% by weight.

The content of the (meth)acrylic resin contained in the (meth)acrylic resin composition is preferably 70% by weight or more and 99.99% by weight or less, more preferably 90% by weight or more and 99.99% by weight or less. However, the total amount of the (meth)acrylic resin and the inorganic filler is taken as 100% by weight. By setting the content of the (meth)acrylic resin within the above-described range, it is possible to obtain an injection molded body which is more excellent in scratch resistance even when it is colored and having high glossiness.

The inorganic filler used in the present invention includes, for example, metal salts such as calcium carbonate, barium sulfate and the like; metal hydroxides such as aluminum hydroxide and the like; metal oxides such as silica, titania, alumina, zirconia, glass, magnesium oxide, zinc oxide and the like; etc., and metal oxides are preferable. The inorganic filler may be subjected to a surface treatment. In the present invention, one kind of inorganic filler may be used, or two or more kinds of inorganic fillers may be used. As the inorganic filler, a spherical inorganic particle is preferable in that an injection molded body excellent in scratch resistance even when it is colored can be obtained.

The average particle diameter of the inorganic particle is preferably 0.1 μm or more and 100 μm or less, more preferably 0.1 μm or more and 20 μm or less, further preferably more than 0.1 μm and 20 μm or less. Ra can be increased by increasing the average particle diameter of the inorganic particle. By adjusting the average particle diameter of the inorganic particle within the above-described range, it is possible to obtain an injection molded body excellent in scratch resistance even when it is colored and having high glossiness. The average particle diameter of the inorganic particle can be measured by a dynamic light scattering method when it is less than 5 μm, and can be measured by a laser diffraction method when it is 5 μm or more. The average particle diameter of the inorganic particle in the present specification represents the primary particle diameter.

The content of the inorganic filler contained in the (meth)acrylic resin composition is preferably 0.01% by weight or more and 30% by weight or less, more preferably 0.01% by weight or more and 10% by weight or less, further preferably 0.01% by weight or more and 5% by weight or less. However, the total amount of the (meth)acrylic resin and the inorganic filler is taken as 100% by weight. By adjusting the content of the inorganic filler within the above-described range, it is possible to obtain an injection molded body which is more excellent in scratch resistance even when it is colored and having high glossiness.

The (meth)acrylic resin composition may contain a colorant. As the colorant, pigments, dyes and the like can be used. Examples thereof include inorganic pigments such as titanium oxide, zinc oxide, carbon black and the like, organic pigments such as quinacridone, polyazo yellow, anthraquinone yellow, polyazo red, azo lake yellow, perylene, phthalocyanine green, phthalocyanine blue, isoindolinone yellow and the like, oil-soluble dyes such as piano black and the like, and dyes such as direct dyes, acidic dyes, basic dyes and the like. These colorants may be used singly or in combination of two or more kinds. The content of the colorant is preferably 0.001 part by weight or more and 1 part by weight or less with respect to 100 parts by weight of the (meth)acrylic resin composition.

The (meth)acrylic resin composition may contain an antioxidant, a release agent, a lubricant, an antistatic agent and the like. Examples of the antioxidant include a phenol type antioxidant, a sulfur type antioxidant, a phosphorus type antioxidant and the like, examples of the release agent include a higher fatty acid ester, a higher aliphatic alcohol, a higher fatty acid, a higher fatty acid amide, a higher fatty acid metal salt, and the like, and examples of the antistatic agent include conductive inorganic particles, tertiary amines, quaternary ammonium salts, cationic acrylic ester derivatives, cationic vinyl ether derivatives and the like. Examples of the lubricant include a higher fatty acid amide. In the present specification, "higher fatty acid" means a fatty acid having 12 or more carbon atoms. In general, the substances that can function as the lubricant may include those that can function as the release agent, on the contrary, the substances that can function as the release agent may include those that can function as the lubricant. For example, the higher fatty acid amide is an example of a substance that can function both as the lubricant and as the release agent in the present invention. When a certain substance can function both as the lubricant and as the release agent, the preferable blend amount for the substance to function efficiently as the lubricant and the preferable blend amount for the substance to function efficiently as the release agent are differently generally, however, when such a substance is blended in certain amount, it can function both as the lubricant and as the release agent in some cases. In general, when a certain substance is to be mainly made to function as the lubricant, it is blended in an amount larger than the blend amount when the substance is intended to function mainly as the release agent.

Examples of the higher fatty acid amide applicable to the present invention include oleic acid amide, erucic acid amide, stearic acid amide and the like. In the present invention, one kind of higher fatty acid amide may be used, or two or more kinds of higher fatty acid amides may be used in combination. The addition amount of the higher fatty acid amide is preferably 0.1 part by weight or more and 5 parts by weight or less with respect to 100 parts by weight of the (meth)acrylic resin composition.

Rubber particles may be blended in the (meth)acrylic resin composition. Impact resistance can be imparted by blending rubber particles in the (meth)acrylic resin composition. As the rubber particles, for example, acrylic rubber particles, butadiene rubber particles, styrene-butadiene rubber particles and the like can be used, and among them, acrylic rubber particles are preferably used from the viewpoint of weather resistance and durability. The rubber particles may be used singly or in combination of two or more kinds.

As a method for producing the (meth)acrylic resin composition, known techniques can be appropriately applied. Examples thereof include a solution mixing method in which a (meth)acrylic resin is dissolved in a solvent and mixing is performed so that an inorganic filler is dispersed in the solution, a method in which a (meth)acrylic resin and an inorganic filler are melt-kneaded using a kneading apparatus such as a single screw extruder, a twin screw extruder, a mixing roll and the like, a cast polymerization method in which in production of a (meth)acrylic resin by polymerization, an inorganic filler is dispersed and polymerization is performed, and an emulsion polymerization method and the like. In the solution mixing method, the temperature of the solution at the time of mixing is preferably 100° C. or lower, in the melt-kneading method, the temperature of the resin at the time of kneading is preferably 200° C. or more and 300° C. or less, and the polymerization temperature in the cast polymerization method is preferably 150° C. or lower and the polymerization temperature in the emulsion polymerization method is preferably 100° C. or less.

The injection molded body of the present invention is excellent in scratch resistance even when it is colored. In the present specification, "coloring" means coloring using the above colorant.

Since the glossiness of the injection molded body obtained by the above-described method at an incident angle of 60° is 60 or more, it can be used as a member which requires high design. The glossiness at an incident angle of 60° is measured in accordance with JIS Z 8741 using a gloss meter.

The injection molded body of the present invention can constitute an automotive member, and the automotive member includes automotive exterior members such as a pillar, a front grill, a rear garnish and the like and automotive interior members such as a power window switch cover and the like.

EXAMPLES

Hereinafter, the present invention will be described with reference to examples, but the present invention is not particularly limited to these examples.

Melt flow rate (MFR, unit: g/10 min)

According to JIS K 7210, MFR of a methacrylic resin was measured at a temperature of 230° C. under a load of 3.8 kg.

Content of monomer unit derived from methyl methacrylate and content of monomer unit derived from methyl acrylate (unit: % by weight):

By analysis using pyrolysis gas chromatography, the content of a monomer unit derived from methyl methacrylate and the content of a monomer unit derived from methyl acrylate with respect to 100% by weight of the total amount of monomer units contained in the methacrylic resin were calculated.

<Pyrolysis Condition>

Sample Preparation: A methacrylic resin was precisely weighed (rough indication: 2 to 3 mg) and placed in the center of a metal cell formed into a tub shape, and the metal cell was folded and both ends thereof were lightly pressed with pliers to seal.

Pyrolyzer: CURIE POINT PYROLYZER JHP-22 (manufactured by Japan Analytical Industry Co., Ltd.)

Metal cell: Pyrofoil F 590 (manufactured by Japan Analytical Industry Co., Ltd.)

Setting temperature of thermostatic chamber: 200° C.

Setting temperature of heat insulation pipe: 250° C.

Pyrolysis temperature: 590° C.

Pylolysis time: 5 seconds

<Gas Chromatography Analysis Conditions>

Gas chromatography analyzer: GC-14B (manufactured by Shimadzu Corporation)

Detection method: FID

Column: 7G, length 3.2 μm×inner diameter 3.1 mm (manufactured by Shimadzu Corporation)

Filler: FAL-M (manufactured by Shimadzu Corporation, packed column)

Carrier gas: air/$N_2$/$H_2$ pressure=50 kPa/100 kPa/50 kPa

Flow rate: 80 ml/min

Temperature rising condition of column: holding at 100° C. for 15 minutes→heating up to 150° C. at a rate of 10° C./min→holding at 150° C. for 14 minutes INJ temperature (temperature at the column inlet): 200° C.

DET temperature (temperature at the detection side): 200° C.

A methacrylic resin was pyrolyzed under the above-mentioned pyrolysisconditions, and the generated pyrolyzed products were analyzed under the above-described gas chromatography analysis conditions, and the peak area (a1) corresponding to the amount of methyl methacrylate detected and the peak area (b1) corresponding to the amount of the acrylate ester detected were measured. Then, from these peak areas, the peak area ratio A (=b1/a1) was determined.

On the other hand, a standard product of a methacrylic resin in which the weight ratio of a monomer unit derived from methyl acrylate to a monomer unit derived from methyl methacrylate is a known value W0 (weight of monomer unit derived from methyl acrylate/weight of monomer unit derived from methyl methacrylate) was pyrolyzed under the above-mentioned pyrolysis conditions, and the generated pyrolyzed products are analyzed under the above-described gas chromatography analysis conditions, and the peak area (a0) corresponding to the amount of methyl methacrylate detected and the peak area (b0) corresponding to the amount of methyl acrylate detected were measured, and from these peak areas, the peak area ratio A0 defined by b0/a0 was determined.

A factor f defined by W0/A0 was determined from the peak area ratio A0 and the above weight ratio W0.

Next, by multiplying the peak area ratio A by the above-mentioned factor f, the weight ratio W of a monomer unit derived from methyl acrylate to a monomer unit derived from methyl methacrylate contained in the methacrylic resin as the measurement subject (weight of monomer unit derived from methyl acrylate/weight of monomer unit derived from methyl methacrylate) was determined, and from this weight ratio W, the ratio (% by weight) of the monomer unit derived from methyl methacrylate and the ratio (% by weight) of the monomer unit derived from methyl acrylate with respect to the total amount of the monomer unit derived from methyl methacrylate and the monomer unit derived from methyl acrylate were calculated, respectively.

Arithmetic Average Roughness (Ra) of Surface of Injection Molded Body and Average Pore Diameter of Non-Through Hole (Recess):

The surface profile of the injection molded body was measured using a three-dimensional surface structure analysis microscope ("NewView 600" manufactured by zygo). Specifically, the size of the measurement visual field was set to 0.70 mm×0.53 mm, the measurement conditions were set as follows, and the surface of the injection molded body was photographed to obtain an image. From the obtained image, the average pore diameter (unit: μm) of the non-through hole on the surface of the injection molded body was calculated.

<Measurement Condition>

Lens: 12

Objective lens: 10 times

Measurement conditions

Camera Mode: 640×480 72 Hz

Substruct Sys Err: OFF
Min Mod (%): 7
Min Area Size: 7
Scan length: 100 μm
FDA Res: normal
<Measurement Location>
Center of Injection Molded Body The obtained image was analyzed with an analyzing computer under the following analysis conditions and the arithmetic average roughness Ra (unit: nm) in the measurement visual field was determined according to JIS B 0601.
<Analysis Condition>
Filter: OFF
Filter Type: average
Filter Window Size: 3
Trim Mode: All
Remove Spike: OFF
Spike Height: 2.5
Data Fill: OFF
Data Fill Max: 25
Pencil Hardness Measurement Using a pencil hardness tester manufactured by Yasuda Seiki Seisakusho Ltd., the pencil hardness of the surface of the molded body was measured in accordance with JIS K 5600.

Glossiness at an Incident Angle of 60°

Using "MULTIGLOSS 268 plus" manufactured by Konica Minolta, Inc., the glossiness of the surface of the molded body was measured in accordance with JIS Z 8741.

Steel wool scratch test: Evaluation was carried out using "Planar abrasion tester PA-2A" manufactured by DAIEI KAGAKU SEIKI MFG. Co., Ltd. under the following conditions.

Abrasion stroke: 140 mm
Test stand reciprocating speed: 60±2 times/min
Test stand reciprocation number: 5 reciprocations
Test load: 1000 g
Abrasion surface: 2 cm×2 cm
steel wool count: #0000 (manufactured by BONSTAR SALES Co., Ltd.)

Evaluation place: carried out (3 times in total) using molded bodies (60 mm×120 mm×3 mm) obtained by dividing the injection molded body (200 mm×120 mm×3 mm) into three parts
Working Glove Scratch Test Using "Planar abrasion tester PA-2A" manufactured by DAIEI KAGAKU SEIKI MFG. Co., Ltd., it was evaluated according to the following conditions.

Abrasion stroke: 140 mm
Test stand reciprocating speed: 60±2 times/min
Test stand reciprocation number: 20 reciprocations
Test load: 2000 g
Abrasion surface: 2 cm×2 cm
Working glove: 100% cotton working glove (manufactured by MITANI Textile Manufacturing Co., Ltd.)

Evaluation place: carried out (3 times in total) using molded bodies (60 mm×120 mm×3 mm) obtained by dividing the injection molded body (200 mm×120 mm×3 mm) into three parts Using the "spectroscopic colorimeter SD-7000" manufactured by Nippon Denshoku Industries Co., Ltd., the surface of the molded body before and after the steel wool scratch test or the work glove scratch test was measured in accordance with JIS Z 8722 and ΔE+ab was calculated according to JIS Z 8730.

Measurement method: SCE (regular reflection removed)
Measurement light source: D65
Measurement visual field: 10° The smaller the value of ΔE*ab, the better the scratch resistance.

Main Materials Used

Silica 1: Snowtex O (average particle diameter: 18 nm) manufactured by Nissan Chemical Industries, Ltd.

Silica 2: Admafine SO-C1 (average particle diameter: 0.3 μm) manufactured by Admatechs Co., Ltd.

Silica 3: Admafine SO-C2 (average particle diameter: 0.5 μm) manufactured by Admatechs Co., Ltd.

Silica 4: Admafine SO-C5 (average particle diameter: 1.5 μm) manufactured by Admatechs Co., Ltd.

Silica 5: Sunsphere NP-30 (average particle diameter: 4.0 μm) manufactured by AGC SITEC Co., Ltd.

Glass filler: CF0025-05C (average particle diameter: 5.0 μm) manufactured by Nippon Frit Co., Ltd.

Piano black dye: "Sumiplast Black HLG" manufactured by Sumika Chemtex Co., Ltd.

Lubricant 1: Neutron S (main component: erucamide) manufactured by Nippon Fine Chemical Co., Ltd.
<Production of Methacrylic Resin A>

Into a polymerization reactor equipped with a stirrer were supplied a mixture of 97.5 parts by weight of methyl methacrylate and 2.5 parts by weight of methyl acrylate, 0.016 parts by weight of 1,1-di(t-butylperoxy)cyclohexane, and 0.16 parts by weight of n-octylmercaptan, respectively continuously, and a polymerization reaction was carried out at an average residence time 43 minutes at 255° C. Subsequently, the reaction liquid (partial polymer) leaving the polymerization reactor was preheated, then, supplied to a devolatilizing extruder, the unreacted monomer component was vaporized and recovered, and a pelletized methacrylic resin A was obtained. The content of the monomer unit derived from methyl methacrylate was 97.5% by weight and the content of the monomer unit derived from methyl acrylate was 2.5% by weight in the resultant methacrylic resin A, and MFR thereof was 2 g/10 minutes.

Example 1

<Granulation>

The methacrylic resin A (98% by weight) and the silica 2 (2% by weight) were mixed, then, melt-kneaded using a single screw extruder having a screw diameter of 20 mm (D20-25 manufactured by Toyo Seiki Co., Ltd.) to obtain a methacrylic resin composition, this was extruded in a strand form, cooled with water, and cut with a strand cutter to obtain a pelletized methacrylic resin composition.
(Granulation Condition)

Extruder temperature: The temperatures of four heaters provided on the barrel of the extruder between the raw material input port and the outlet of the extruder were set to 200° C., 230° C., 240° C. and 250° C., respectively in sequence from the raw material input port side.

Screw rotation speed: 75 rpm
<Injection Molding>

The obtained pelletized methacrylic resin composition was molded into a flat plate shape with 200 mm×120 mm×3 mm thick using an injection molding machine (IS-130F manufactured by Toshiba Machine Co., Ltd.) to obtain an injection molded body.
(Molding Conditions)

Screw temperature: The temperatures of five heaters provided on the screw of the injection molding machine between the raw material input port and the outlet of the injection molding machine were set to 210° C., 220° C., 220° C., 230° C. and 230° C., respectively in sequence from the raw material input port side.

Injection pressure (PI): 70 MPa (corresponding to 35% of the maximum pressure)
Holding pressure (PH): 71 MPa (corresponding to 35% of maximum pressure)
Mold temperature: 60° C.

Example 2

Molding was carried out in the same manner as in Example 1 described above except that 0.46 parts by weight of a piano black dye was further added and mixed with respect to 100 parts by weight of the methacrylic resin composition. In Table 1, "piano black dye" is expressed as "PB dye".

Examples 3, 5, 7, 9

Molding was carried out in the same manner as in Example 1 described above except that the inorganic particle in Table 1 was used instead of the silica 2.

Examples 4, 6, 8, 10

Molding was carried out in the same manner as in Example 2 described above except that the inorganic particle in Table 1 was used instead of the silica 2.

Comparative Example 1

The methacrylic resin A was molded into a flat plate shape with 200 mm×120 mm×3 mm thick using an injection molding machine (IS-130F manufactured by Toshiba Machine Co., Ltd.).
(Molding Conditions)
Screw Temperature: The temperatures of five heaters provided on the screw of the injection molding machine between the raw material input port and the outlet of the injection molding machine were set to 210° C., 220° C., 220° C., 230° C. and 230° C., respectively in sequence from the raw material input port side.
Injection pressure (PI): 70 MPa (corresponding to 35% of maximum pressure)
Holding pressure (PH): 71 MPa (corresponding to 36% of maximum pressure)
Mold temperature: 60° C.

Comparative Example 2

<Granulation>
The methacrylic resin A (99.55% by weight) and the piano black dye (0.45% by weight) were mixed, then, melt-kneaded using a single screw extruder with a screw diameter of 20 mm to obtain a methacrylic resin composition, this was extruded in a strand form, cooled with water, and cut with a strand cutter to obtain a pelletized methacrylic resin composition.
(Granulation Condition)
Extruder Temperature: The temperatures of four heaters provided on the barrel of the extruder between the raw material input port and the outlet of the extruder were set to 200° C., 230° C., 240° C. and 250° C., respectively in sequence from the raw material input port side.
Rotation speed: 75 rpm
<Injection Molding>
The obtained pelletized methacrylic resin composition was molded into a flat plate shape with 200 mm×120 mm×3 mm thick using an injection molding machine (IS-130F manufactured by Toshiba Machine Co., Ltd.) to obtain an injection molded body.
(Molding Conditions)
Screw temperature: The temperatures of five heaters provided on the screw of the injection molding machine between the raw material input port and the outlet of the injection molding machine were set to 210° C., 220° C., 220° C., 230° C. and 230° C., respectively in sequence from the raw material input port side.
Injection pressure (PI): 70 MPa (corresponding to 35% of maximum pressure)
Holding pressure (PH): 71 M Pa (corresponding to 36% of maximum pressure)
Mold temperature: 60° C.

Comparative Example 3

(Emulsion Polymerization)
Into a glass reaction vessel were charged 2300 parts by weight of pure water, 990 parts by weight of the silica 1 and 23.4 parts by weight of sodium dodecylbenzenesulfonate and stirred at 200 rpm for 30 minutes under a nitrogen atmosphere. Next, the obtained mixture was heated to 83° C. while stirring at 200 rpm, and 997.1 parts by weight of methyl methacrylate, 43.4 parts by weight of methyl acrylate, 3.5 parts by weight of normal octyl mercaptan, 1.0 part by weight of sodium persulfate and 400 parts by weight of pure water were continuously added at the same temperature over a period of 50 minutes, and after completion of addition, further aged for 30 minutes while stirring. Thereafter, the resultant mixture was heated to 98° C., held at the same temperature for 30 minutes, then, cooled to room temperature to obtain a dispersion containing methacrylic resin particles and silica particles.
(Salting Out/Washing/Drying)
The resultant dispersion was cooled at −20° C. for 24 hours to be frozen and the frozen dispersion was melted to obtain a slurry containing an aggregate of methacrylic resin particles and silica particles. The slurry was then filtered to isolate the aggregate. This aggregate was poured into 20 times by weight of pure water, stirred, then, filtrated, to wash it. This washing operation was repeated three times, then, dried in an oven set at 80° C. to obtain a powdery methacrylic resin composition.
(Molding)
Molding was carried out in the same manner as in Comparative Example 1 except that the powdery methacrylic resin composition described above was used instead of the methacrylic resin A.

Comparative Example 4

Molding was carried out in the same manner as in Comparative Example 2 except that the powdery methacrylic resin composition described above was used instead of the methacrylic resin A.

Comparative Example 5

Molding was carried out in the same manner as in Example 8 described above except that the mold temperature during injection molding was set to 40° C.

TABLE 1

|  | inorganic particle | particle diameter | PB dye |
|---|---|---|---|
| Example 1 | silica 2 | 0.3 μm | non |
| Example 2 | silica 2 | 0.3 μm | contained |
| Example 3 | silica 3 | 0.5 μm | non |
| Example 4 | silica 3 | 0.5 μm | contained |
| Example 5 | silica 4 | 1.6 μm | non |
| Example 6 | silica 4 | 1.6 μm | contained |
| Example 7 | silica 5 | 4.0 μm | non |
| Example 8 | silica 5 | 4.0 μm | contained |
| Example 9 | glass filler | 5.0 μm | non |
| Example 10 | glass filler | 5.0 μm | contained |
| Comparative Example 1 | non |  | non |
| Comparative Example 2 | non |  | contained |
| Comparative Example 3 | silica 1 | 18 nm | non |
| Comparative Example 4 | silica 1 | 18 nm | contained |
| Comparative Example 5 | silica 5 | 4.0 μm | contained |

As shown in FIG. 1, the injection molded body obtained in Example 4 had a non-through hole with an average pore diameter of 30 μm on its surface. Further, the results of measurements of the surface arithmetic average roughness, pencil hardness and glossiness of the molded bodies obtained in Examples 1 to 10 and Comparative Examples 1 to 5 are shown in Table 2. In Comparative Examples 1, 2, 3 and 4, the pencil hardness is significantly lower in the molded body to which the dye was added than in the molded body without addition. In Comparative Example 5, the arithmetic average roughness is high and glossiness is remarkably low, since the mold temperature was lowered. On the other hand, in Examples 1 to 10, the pencil hardness of the molded body to which the dye was added is almost the same as that of the molded body without addition of the dye. It is understood from the above results that the injection molded body whose surface arithmetic average roughness is 20 nm or more and 280 nm or less is excellent in scratch resistance even when it is colored and has high glossiness, as compared with the injection molded body whose surface arithmetic average roughness is less than 20 nm or more than 280 nm.

TABLE 2

|  | pencil hardness | arithmetic average roughness | particle diameter | glossiness |
|---|---|---|---|---|
| Example 1 | 3 H | 23 nm | 0.3 μm | — |
| Example 2 | 2 H | 20 nm | 0.3 μm | 85 |
| Example 3 | 3 H | 31 nm | 0.5 μm | — |
| Example 4 | 3 H | 29 nm | 0.5 μm | 85 |
| Example 5 | 3 H | 72 nm | 1.6 μm | — |
| Example 6 | 3 H | 76 nm | 1.6 μm | 76 |
| Example 7 | 3 H | 135 nm | 4.0 μm | — |
| Example 8 | 3 H | 105 nm | 4.0 μm | 71 |
| Example 9 | 3 H | 130 nm | 5.0 μm | — |
| Example 10 | 3 H | 123 nm | 5.0 μm | 71 |
| Comparative Example 1 | 2 H | 12 nm | — | — |
| Comparative Example 2 | 4 B | 12 nm | — | 87 |
| Comparative Example 3 | 4 H | 15 nm | 18 μm | — |
| Comparative Example 4 | F | 17 nm | 18 μm | 86 |
| Comparative Example 5 | 3 H | 290 nm | 4.0 μm | 55 |

Example 11

Molding was carried out in the same manner as in Example 4 described above except that 2.0 parts by weight of the lubricant 1 was further added and mixed with respect to 100 parts by weight of the methacrylic resin composition obtained in Example 4.

Table 3 shows the evaluation results of the steel wool scratch test of the molded bodies obtained in Examples 4 and 11 and Comparative Example 2. In Comparative Example 2, the value of ΔE*ab was remarkably large. On the other hand, in Examples 4 and 11, the value of ΔE*ab was small. It is understood from the above results that the injection molded body whose surface arithmetic average roughness is 20 nm or more and 280 nm or less has higher scratch resistance even when it is colored, as compared with the injection molded body whose surface arithmetic average roughness is less than 20 nm.

TABLE 3

|  | ΔE * ab (average value) |
|---|---|
| Example 4 | 1.1 |
| Example 11 | 1.0 |
| Comparative Example 2 | 17.3 |

Table 4 shows the evaluation results of the working glove scratch test of the molded bodies obtained in Example 11 and Comparative Example 2. In Example 11, the value of ΔE*ab was small, while in Comparative Example 2, the value of ΔE*ab was large. Further, when the surface of the molded body after the working glove scratch test was visually confirmed, scratches were not found on the surface of the molded body of Example 11, while a large number of scratches were found on the surface of the molded body of Comparative Example 2. It is understood from the above results that the injection molded body whose surface arithmetic average roughness is 20 nm or more and 280 nm or less has higher scratch resistance even when it is colored, as compared with the injection molded body whose surface arithmetic average roughness is less than 20 nm.

TABLE 4

|  | ΔE * ab (average value) |
|---|---|
| Example 11 | 0.3 |
| Comparative Example 2 | 0.8 |

The invention claimed is:

1. An injection molded body comprising a (meth)acrylic resin composition containing a (meth)acrylic resin and an inorganic filler and having a surface with an arithmetic average roughness of 20 nm or more and 280 nm or less, wherein the inorganic filler is an inorganic particle with an average particle diameter of 0.3 μm or more and 20 μm or less and wherein the surface of the injection molded body has a non-through hole with an average pore diameter of 30 μm or more and 100 μm or less.

2. The injection molded body according to claim 1, wherein the (meth)acrylic resin composition contains a dye or a pigment.

3. The injection molded body according to claim 1, wherein the inorganic filler is an inorganic particle with an average particle diameter of 0.3 μm or more and 5 μm or less.

4. The injection molded body according to claim 1, wherein the content of the inorganic filler in the (meth)acrylic resin composition is 0.01% by weight or more and 30% by weight or less.

5. The injection molded body according to claim 4, wherein the content of the inorganic filler in the (meth)acrylic resin composition is 2% by weight or more and 30% by weight or less.

6. The injection molded body according to claim 1, wherein the inorganic filler is a metal oxide.

7. The injection molded body according to claim 6, wherein the metal oxide is silica, alumina, or glass.

8. The injection molded body according to claim 7, wherein the metal oxide is silica or alumina.

9. An automotive member comprising the injection molded body according to claim 1.

* * * * *